United States Patent [19]

Engelmann et al.

[11] 4,268,057
[45] May 19, 1981

[54] CONTROL DEVICE FOR THREE-POINT HITCH

[75] Inventors: Roger F. Engelmann; James E. Thurler, both of Racine, Wis.

[73] Assignee: J. I. Case Company, Racine, Wis.

[21] Appl. No.: 77,523

[22] Filed: Sep. 21, 1979

[51] Int. Cl.³ .......................................... A01B 59/043
[52] U.S. Cl. .................................... 280/474; 172/450
[58] Field of Search .............. 280/474, 446 R, 446 A, 280/446 B, 460 A, 461 A, 415 R; 172/450, 457

[56] References Cited

U.S. PATENT DOCUMENTS

| | | | |
|---|---|---|---|
| 3,047,076 | 7/1962 | Wier et al. | 280/474 |
| 3,627,060 | 12/1971 | Lemmon | 280/474 |
| 3,847,228 | 11/1974 | Slosiarek et al. | 280/474 |
| 3,888,316 | 6/1975 | Azzarello | 280/474 |
| 3,910,355 | 10/1975 | Elfes et al. | 280/474 |
| 4,116,458 | 9/1978 | Berg | 280/474 |

*Primary Examiner*—Randolph A. Reese
*Assistant Examiner*—Donn McGiehan

*Attorney, Agent, or Firm*—Cullen, Sloman, Cantor, Grauer, Scott & Rutherford

[57] ABSTRACT

A sway limiting apparatus is disclosed for three-point hitches which has both sway and non-sway settings to either permit limited lateral movement of the draft arms or maintain a constant dimension between the draft arms while the hitch is being lowered or raised. The sway limiting apparatus includes a contoured sliding block which abuts and slides on a complementary bar bracket adjustably mounted to the tractor frame. The sliding block is slotted for adjustment fore and aft along the draft arm, and it includes both inclined surface portions and a tapered surface portion. In the non-sway setting, the inclined surface portions of the sliding block bear against the bar bracket to restrict any side sway while the hitch is being raised or lowered and to maintain the distance between the hitch connection points at a constant dimension. The bar bracket is selectively moved to a second position for the sway setting wherein the tapered surface portion of the sliding block bears against the bar bracket when controlled or restricted sway movement is desirable.

4 Claims, 4 Drawing Figures

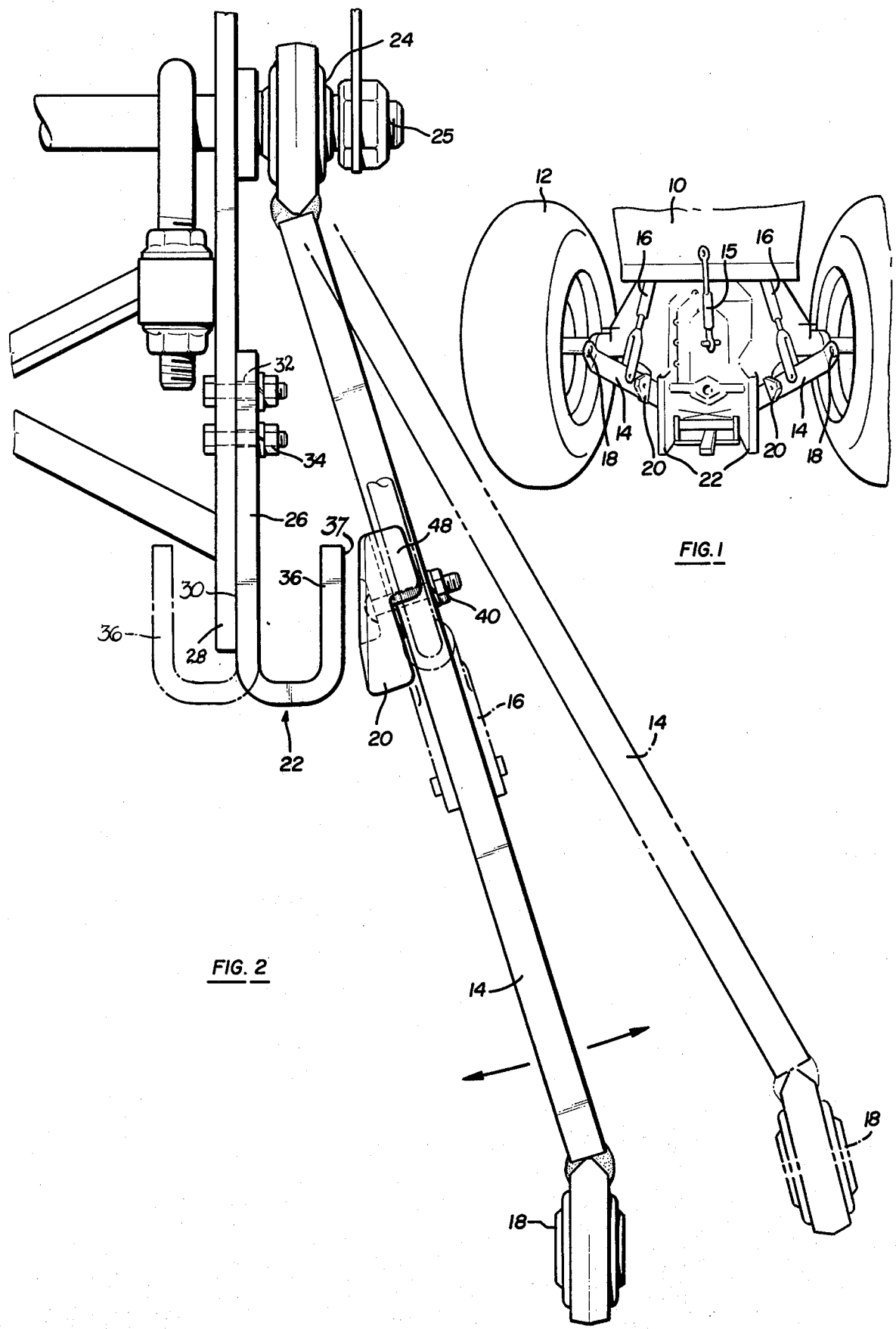

CONTROL DEVICE FOR THREE-POINT HITCH

BACKGROUND OF THE INVENTION

This invention relates to a three-point hitch, and more particularly to a contoured sliding block and bar bracket arrangement which can be set in a non-sway position to maintain a constant dimension between the draft arms while the hitch is either being lowered or raised, or it can be set in a sway position to permit limited lateral movement of draft arms.

A three-point hitch including two lower draft arms and an upper link is a conventional connection between a tractor and implement. A certain amount of lateral sway of the three-point hitch is tolerable and desirable in certain types of tractor mounted implements, such as moldboard plows, but for other implements, such as cultivators, the lateral movement of the implement relative to the tractor must be restricted or the implement may dig out parts of the crop rows being tilled.

Hitch sway limiting devices are known, and they usually consist of control members associated with the draft arms for limiting the lateral swaying of the three-point hitch throughout its vertical movement or only in the raised tractor travel position. Some prior art sway limitors consist of reversible sway blocks permitting sway of the hitch in the operating position and eliminating sway in the lift position of the hitch as exemplified by the U.S. Pat. Nos. 4,116,458 and 3,847,228. Other prior art sway control devices are adjustable or removable, for controlling the side sway of the draft links. Examples of other prior art sway limiting controls are found in U.S. Pat. Nos. 3,047,076, 3,627,060, 3,888,316 and 3,910,355. These prior art sway blocks of different sizes and configurations are either expensive or difficult and time-consuming to adjust or replace.

Another problem associated with the prior art constructions discussed is that there is no convenient way of adjusting from sway to non-sway, adjusting for wear of the sliding members, or for centering the implement behind the tractor. Adjustments are typically made by using additional parts such as shims or removing and changing parts. Thus, there has been a need for a simple sway limiting device which overcomes the disadvantages of the conventional sway control constructions.

A further problem with controlling the sway of many three-point hitches is that the draft arms do not move along a vertical line when being raised or lowered. That is, the draft arms are raised and lowered by lift links which are pivotally connected to the draft arms at one of their ends and which are pivotally connected to the tractor frame at their other ends. The lift links are angled such that they converge slightly at the ends pivotally connected to the tractor frame. Thus, the lift links are not perpendicular to the draft arms, and as the draft arms are raised and lowered, the movement of the draft arms is slightly arcuate rather than being along a straight line. There has been a need for a sliding sway control member which compensates for the arcuate movement of the draft arms to maintain a constant dimension between the draft arms in a non-sway setting as the draft arms are raised and lowered.

SUMMARY OF THE INVENTION

In accordance with the present invention, a sway limiting device is provided for three-point hitches which is constructed to maintain a constant dimension between the implement connection points of the draft arms in a non-sway setting while the hitch is either being lowered or raised. The sway limiting device also has a sway setting which permits limited lateral movement of the draft arms. The sway limiting device may be used on any tractor or other machine where a three-point or similar style attaching hitch is used.

The sway limiting device includes a contoured sliding block which abuts against the slides on an opposed complementary bar bracket when an implement is hitched. A sliding block is fastened to each of the lower draft arms, and each sliding block is slotted in a fashion so as to permit it to be moved fore and aft along the draft arm. The side sway or lateral swinging movement of the draft arms is controlled by the sliding engagement between the sliding block and its opposed complementary bar bracket.

The sliding block includes inclined surface portions and a tapered surface portion to provide both sway and non-sway settings. The inclined surface portions are used in the non-sway setting control the distance between the implement connections points at a constant dimension while the hitch is either being lowered or raised. The non-sway setting is used for implements such as cultivators where it is desirable that the implement be restricted from any side sway throughout its working range as well as in the transport position. The tapered surface portion is used in a sway condition for implements such as moldboard plows where it is desirable that the implement be allowed controlled or limited sway to move independently of the movement of the tractor.

The contoured blocks slide on bar brackets which are adjustably fastened to the tractor frame. The bar brackets are generally "J"-shaped, and the longer legs of the brackets are fastened to the tractor frame. The short legs of the brackets are parallel to one another and extend vertically to provide bearing surfaces on which the blocks slide during the non-sway setting. The bar brackets are mounted to the tractor frame at this first position for the non-sway setting of the sliding block, and they are flipped inboard to a second position for the sway setting of the sliding block. The bar brackets are adjustable to conform to either the sway or non-sway settings of the sliding blocks.

The inclined surface portions of the sliding block meet together at a crest which is substantially in the middle of the sliding block body. As the draft arms raised from their lowest position, the line of contact between the sliding block and its opposed complementary bar bracket bearing surface slidingly shifts from a point on one of the inclined surfaces to the crest and finally to a point on the other inclined surface. Thus, in the non-sway settting, a controlled rolling action occurs between the sliding block and its bearing surface to accommodate the arcuate movement of the draft arms while maintaining a constant dimension between the implement connection points.

The bar brackets are moved inboard towards the rear of the tractor frame when limited sway is desired. In this setting, the tapered surface portion of the sliding block slidingly engages the bar bracket to permit the implement limited sway movement independent of the tractor movement.

The configuration of the sliding block including the inclined surface portions, tapered surface portion, and slotted opening for adjustment provides several features and advantages over the prior art. The normal wear of the sliding members can be compensated for because the blocks are adjustable to prevent wear looseness. The slotted blocks permit the hitch and attached implements to be centered behind the tractor. The blocks are movable fore and aft along the draft arms, and they can be moved together or individually to center the attached implement. Adjustments can be made without the need for any additional parts such as shims. The bar brackets are moved on the tractor frame depending on the desired sway setting. Thus, the sliding block may be conveniently used in a sway or non-sway mode of operation without requiring additional parts.

Other advantages and meritorious features of the sway limiting apparatus will be more fully understood from the following description of the preferred embodiment, the appended claims, and the drawings, a brief description of which follows.

BRIEF DESCRIPTION OF THE DRAWINGS

FIG. 1 is an end view of the rear portion of a tractor, fragmentary in nature, showing an implement attaching hitch mechanism having incorporated therein the sway limiting apparatus of the present invention.

FIG. 2 is a fragmentary top plan view of one of the draft arms and illustrating the sliding block and bar bracket of the present invention in a non-engaged condition before an implement is connected.

DESCRIPTION OF THE PREFERRED EMBODIMENT

Figure 3:
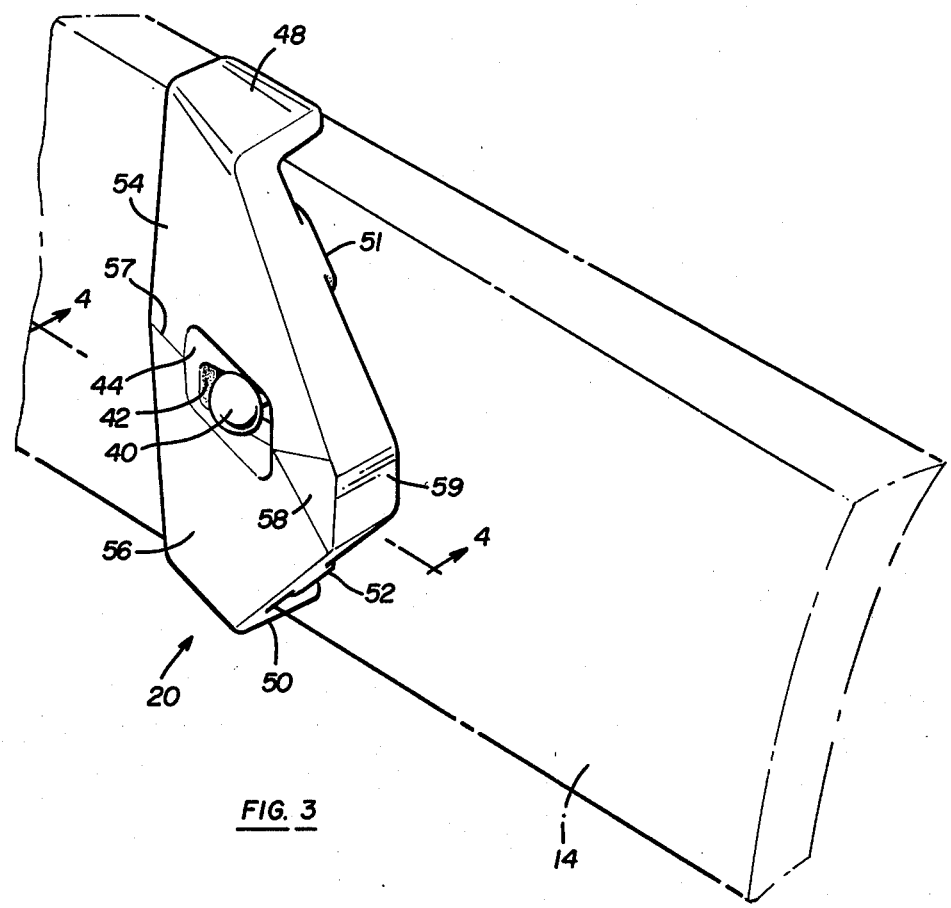
FIG. 3 is a perspective view of an individual sliding block.

Referring to FIG. 1, there is shown the rear section of a tractor-type machine 10. The invention herein is adapted for use with a variety of conventional tractors, automotive or truck-type units where a three-point or similar style attaching hitch is used.

The tractor 10 includes a main frame supported in part by rear wheels 12. Pivotally mounted on opposite sides of the main frame structure are lower draft arms 14. The draft arms extend rearwardly and diverge outwardly away from one another. The draft arms are pivotally secured at their forward ends to the tractor by ball connectors 24 (FIG. 2) mounted on pivot shafts 25. The rearward or aft ends of draft arms 14 are provided with swivel ball type connectors 18 to attach an implement as is conventional.

Lift links 16 connect the respective draft arms 14 to suitable power lift means (not shown) for raising and lowering the hitch mechanism. The draft arms 14, as illustrated in FIG. 1, do not move along a vertical line when being raised or lowered. The lift links 16 are pivotally connected to the draft arms at one of their ends and are pivotally connected to the tractor frame at their other ends. The lift links 16 are angled such that they converge slightly at the ends pivotally connected to the tractor frame. Thus, the lift links 16 are not perpendicular to the draft arms 14, and as the draft arms 14 are raised and lowered, the movement of the draft arms is slightly arcuate rather than being along a straight line.

The mast of the implement (not shown) is pivotally connected by upper link 15 to the tractor's frame. The draft arms 14 are capable of swinging from side to side and are pivotable about transverse horizontal axis 25 upon actuation of the powered lift means.

The sway limiting device includes a contoured sliding block 20 which abuts against and slides on an opposed complementary bar bracket 22 when an implement is hitched. A sliding block 20 is fastened to each of the lower draft arms 14. When an implement is hitched to the vehicle, the sliding blocks 20 slidingly engage their opposed complementary bar brackets 22 to control the side sway or lateral swinging movement of the draft arms.

The sway limiting device of the present invention is constructed to maintain a constant dimension between the implement connection points of the draft arms in a non-sway setting while the hitch is either being lowered or raised. The sway limiting device also has a sway setting which permits limited lateral movement of the draft arms. The sway limiting device may be used on any tractor or other machine where a three-point or similar style attaching hitch is used.

The bar brackets 22 are adjustably fastened to the tractor frame members 28. The bar brackets 22 are generally "J"-shaped, and the longer legs 26 of the brackets are fastened to the tractor frame 28. The short legs 36 of the brackets are parallel to one another and extend vertically to provide bearing surfaces 37 on which the blocks 20 slide during the non-sway setting. The bar brackets are mounted to the tractor frame through openings 32 by bolts 34. Each bracket 22 is adjustable between the solid line position illustrated in FIG. 2 and the phantom line position illustrated in FIG. 2 to provide either the sway or non-sway settings.

The vertical, parallel bearing surfaces 37 aid in maintaining a constant dimension between the sliding blocks 20 and the hitch connection points 18 at the aft ends of the draft arms during the non-sway setting.

Figure 4:
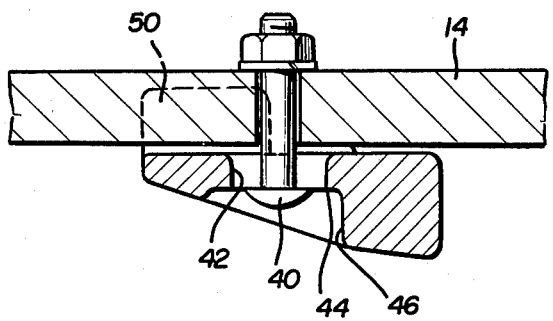
FIG. 4 is a cross-sectional view taken along line 4—4 in FIG. 3.

Referring to FIGS. 2, 3 and 4, each sliding block 20 is generally trapezoidal in plan view and generally wedge shaped in cross-section as exemplified by FIGS. 3 and 4. The sliding blocks 20 are fastened to the lower draft arms 14 by bolts 40 which pass through slotted openings 42. Slotted opening 42 permits the sliding block 20 to be moved fore and aft along the draft arm 14. The slotted area in the block further includes flat surfaces 44 and 46. Upper and lower wing leg portions 48 and 50 engage the upper and lower surfaces of draft arms 14 to prevent vertical shifting of the block 20 as it slides along vertical bearing surface 37 of bar bracket 22 during the non-sway setting or along surface 30 during the sway setting. Embossments 51 and 52 bear against the side of draft arm 14 to slightly space the main wedge shaped body of the block from the side of the draft arm.

Each sliding block 20 includes a contoured surface and a tapered surface to provide both sway and non-sway settings. The contoured surface includes surface portion 54 which is inclined outwardly from leg 48 and surface portion 56 which is inclined outwardly from leg 50. The inclined surface portions 54 and 56 meet together at a crest 57 which is substantially in the middle of the sliding block body.

The contoured surface of sliding block 20, including inclined surface portions 54 and 56 and crest 57, is used in the non-sway setting where the distance between the hitch connection points 18 must be maintained at a constant dimension while the hitch is either being lowered or raised. In the non-sway setting, bar bracket 22 is mounted in the solid line position illustrated in FIG. 2 and inclined surface portions 54 and 56 slidingly engage bar bracket bearing surface 37. As the draft arms 14 are raised from their lowest position, the line of contact between the sliding block and its opposed complementary bar bracket bearing surface 37 slidingly shifts from a point on the inclined surface 56 to the crest 57 and finally to a point on the inclined surface 54. Thus, in the non-sway setting, a controlled rolling action occurs between the sliding block and its bearing surface 37 to accommodate the arcuate movement of the draft arms while maintaining a constant dimension between the implement connection points.

The bar brackets 22 are selectively flipped inboard for mounting in the phantom line position illustrated in FIG. 2 when the sway setting is desired. In the sway setting, the tapered surface portion 58 of the sliding block 20 slidingly engages the bar bracket bearing surface 30 to permit the implement limited sway movement independent of the tractor movement. Tapered surface portion 58 tapers inwardly from vertical slot flat 46 to flat nose portion 59. The sway setting is used for implements such as moldboard plows where it is desirable that the implement be allowed controlled or limited sway to move independently of the movement of the tractor.

In operation, an implement is attached to the three-point hitch arrangement illustrated in FIGS. 1 and 2 between hitch connection points 18 thereby causing sliding blocks 20 to engage the bar brackets 22. If the implement being attached is a plow or the like, bar brackets 22 are mounted to the tractor frame 28 in the phantom line position to provide a sway setting. In the sway setting, the tapered surfaces 58 of the sliding blocks 20 slidingly engage bar bracket bearing surfaces 30 to permit controlled or limited side sway movement of the implement. For cultivators or the like, bar brackets 22 are mounted to the tractor frame 28 in the solid line position to provide a non-sway setting. In the non-sway setting, inclined surface portions 54 and 56 slidingly engage bar bracket bearing surfaces 37 as discussed to restrict the implement from side sway and to maintain a constant dimension between implement hitch connection points 18.

The sliding blocks 20 also permit the hitch and attached implement to be centered behind the tractor without the need for additional parts such as shims. The blocks 20 are movable fore and aft along the draft arms by loosening bolts 40 through slotted openings 42. To center the implement, the blocks 20 are selectively moved together or individually until the proper adjustment is obtained.

The configuration of the sliding blocks 20 including the inclined surface portions 54, 56, tapered surface portions 58 and slotted openings 42 for adjustment provide several features and advantages over the prior art. The normal wear of the sliding members can be compensated for because the sliding blocks 20 are adjustable to prevent wear looseness. The sliding blocks 20 also permit the hitch and attached implement to be centered behind the tractor. Sway and non-sway modes of operation are easily set by adjusting the bar brackets 22 on the tractor frame so that either the inclined surface portions 54, 56 of the sliding blocks 20 or the tapered surface portions 58 of the sliding blocks 20 slidingly engage the bar bracket bearing surfaces 37 or 30. Thus, the sway limiting apparatus of the present invention may be conveniently shifted from sway to non-sway without using any additional parts.

It will be apparent to those skilled in the art that the foregoing disclosure is exemplary in nature rather than limiting, the invention being limited only by the appended claims.

We claim:

1. A tractor having a hitch assembly including draft arms laterally spaced and pivotally mounted at one end to the tractor frame for lateral and vertical movement relative thereto, the improvement comprising:

bar bracket means mounted to said tractor frame adjacent each of said draft arms, said bar bracket means being adjustable on said tractor frame to provide both sway and non-sway implement settings, said bar bracket means including a mounting surface and a spaced-apart vertical bearing surface, said bar bracket means being generally J-shaped and said mounting surface being generally parallel to said bearing surface, said bar bracket means being mounted to said tractor frame at one position for said sway implement setting, and said bar bracket means being mounted to said tractor frame at a second position for said non-sway implement setting;

a sliding block mounted to each draft arm for sliding engagement with said bar bracket means, said sliding block including a contoured surface portion and a tapered surface portion, said contoured surface portion of said sliding block including inclined surface portions which meet at a crest substantially in the middle of the body of the sliding block, the contact point between said contoured surface portion and its opposed bar bracket being slidably shiftable from a point on one of said inclined surfaces to the crest and finally to a point on the other inclined surface as said draft arms are raised and lowered in the non-sway implement setting;

said sliding block and said bar bracket means being adjusted to said non-sway implement setting such that said contoured surface portion slidingly engages said bar bracket bearing surface to maintain a constant dimension between said draft arms while said hitch assembly is either being lowered or raised; and said sliding block and said bar bracket means being adjusted to said sway implement setting such that said tapered surface portion slidingly engages said bar bracket to permit a limited sway of said hitch assembly independent of the movement of said tractor.

2. The invention as defined in claim 1 wherein each said sliding block is adjustable to permit it to be moved fore and aft along a respective draft arm to center an implement attached to the hitch assembly.

3. A tractor having a hitch assembly including draft arms laterally spaced and pivotally mounted at one end to the tractor frame for lateral and vertical movement thereto, the improvement comprising:

bar bracket means mounted to said tractor frame adjacent each of said draft arms, said bar bracket means being adjustable on said tractor frame to provide both sway and non-sway implement settings, said bar bracket means including a mounting surface and a spaced-apart vertical bearing surface;

a sliding block mounted to each draft arm for sliding engagement with said bar bracket means, said sliding block including a contoured surface portion and a tapered surface portion, each sliding block being generally trapezoidal in plan view and generally wedge-shaped in cross-section, said sliding block having upper and lower leg portions which engage upper and lower surfaces of a respective draft arm to prevent vertical shifting of said sliding block when said block is slidingly engaging said bar bracket means;

said sliding block and said bar bracket means being adjusted to said non-sway implement setting such that said contoured surface portion slidingly engages said bar bracket bearing surface to maintain a constant dimension between said draft arms while said hitch assembly is either being lowered or raised; and said sliding block and said bar bracket means being adjusted to said sway implement setting such that said tapered surface portion slidingly emgages said bar bracket to permit a limited sway of said hitch assembly independent of the movement of said tractor.

4. The invention as defined in claim 3 wherein said sliding block includes embossments which bear against the side of said draft arm to slightly space the main body of said block from the side of said draft arm.

* * * * *